United States Patent [19]
Quan et al.

[11] Patent Number: 5,775,253
[45] Date of Patent: Jul. 7, 1998

[54] WARNING TRIANGLE

[75] Inventors: Song Quan, Beijing; Wei Lin, Jiang Xi Provience, both of China

[73] Assignee: Beijing Success Electronic Company Limited, Beijing, China

[21] Appl. No.: 695,427

[22] Filed: Aug. 12, 1996

[30] Foreign Application Priority Data

Apr. 24, 1996 [GB] United Kingdom ............... 9608451

[51] Int. Cl.⁶ .................................................. E01F 9/00
[52] U.S. Cl. .................. 116/63 T; 116/63 P; 40/612
[58] Field of Search .................... 116/63 T, 63 P, 116/28 R; 40/539, 605, 610, 612

[56] References Cited

U.S. PATENT DOCUMENTS

| | | | |
|---|---|---|---|
| 3,135,235 | 6/1964 | Romano | 116/63 P |
| 3,494,499 | 2/1970 | Plog et al. | 116/63 P |
| 3,742,897 | 7/1973 | Meek et al. | 116/63 T |
| 4,875,028 | 10/1989 | Chou | 116/63 T |
| 5,349,346 | 9/1994 | Wu | 116/63 T |
| 5,551,370 | 9/1996 | Hwang | 116/63 T |

FOREIGN PATENT DOCUMENTS

| | | | |
|---|---|---|---|
| B-35227/93 | 10/1993 | Australia | 40/610 |
| 1375342 | 9/1964 | France | 116/63 P |

*Primary Examiner*—William A. Cuchlinski, Jr.
*Assistant Examiner*—Andrew Hirshfeld
*Attorney, Agent, or Firm*—Hodgson, Russ, Andrews, Woods & Goodyear LLP

[57] ABSTRACT

A warning triangle comprising structure erectable into a triangle, a case for containing the structure when collapsed for storage, the case being separable into two parts forming supports with means for receiving respective spaced apart base portions of the erected triangle to support it in an upright position, the erected triangle extending transversely of the Case parts when so supported.

9 Claims, 5 Drawing Sheets

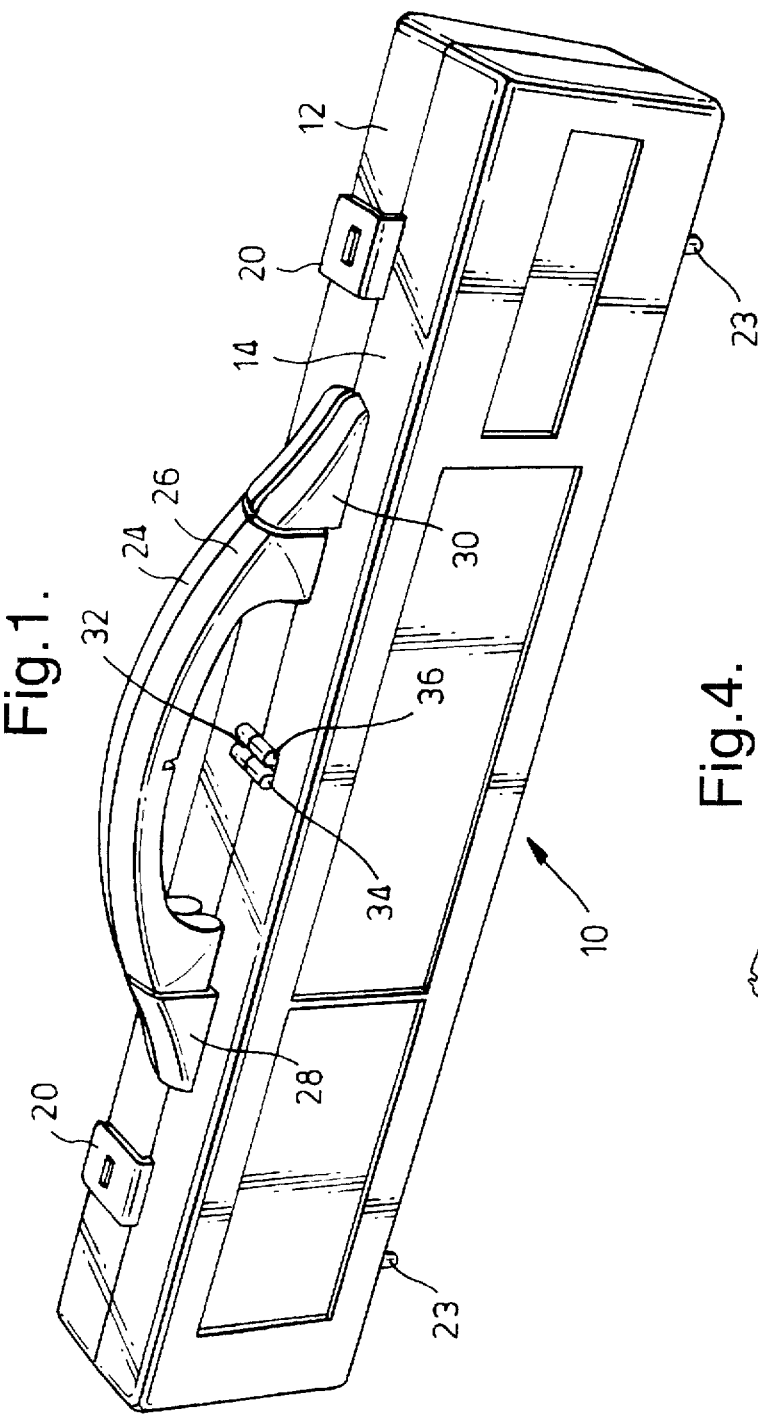
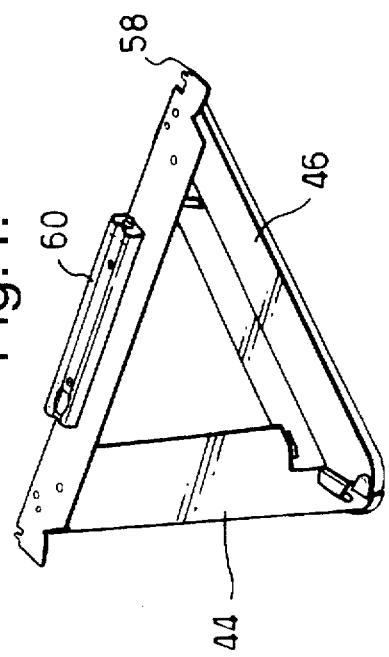

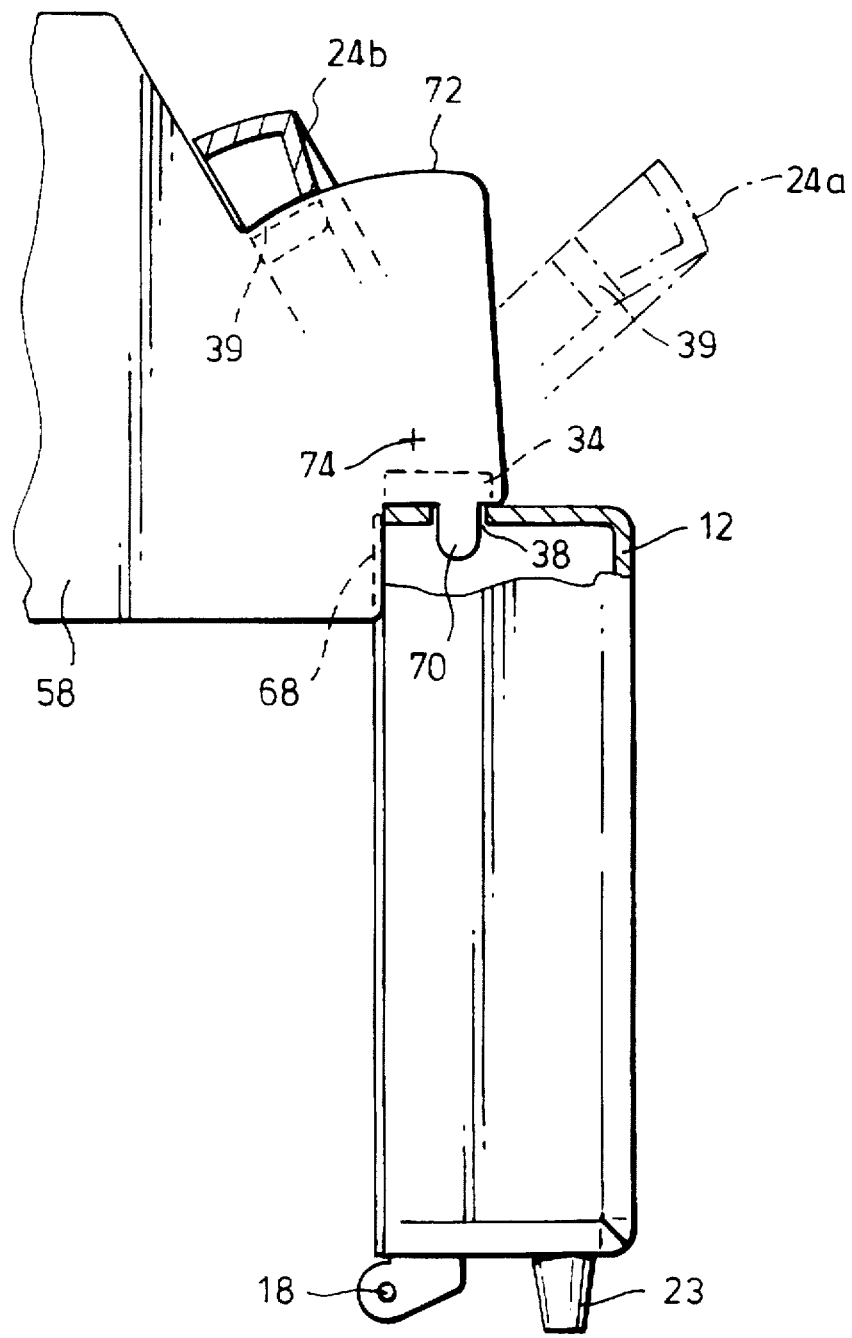

WARNING TRIANGLE

This invention relates to a hazard warning triangle of the type set up behind a disabled motor vehicle as a warning to oncoming traffic.

One such triangle is shavers in GB 2254094. This triangle is housed in a case when not in use, and the case is employed as a support for the erected triangle when it is deployed. However, is common with other known triangles the erected assembly is unstable and may topple if on rough ground, or if disturbed by the wake from a passing truck.

The present invention at least in its preferred embodiments, is directed to avoiding this problem.

According to the invention there is provided a warning triangle comprising structure erectable into a triangle, a case for containing the structure when collapsed for storage, the case being separable into two parts forming supports with means for receiving respective spaced apart base portions of the erected triangle to support it in an upright position, the erected triangle extending transversely of the case parts when so supported.

The parts of the case may receive opposite corners of the base of the erected triangle.

The parts of the case each may have a handle portion positionable to secure the erected triangle to the respective case part.

The erected triangle may have projecting lugs at its base corners which are received in slots in the case parts.

Preferably the triangle comprises a means for illuminating it, for example lights distributed around the sides of the triangle and means for causing the lights to flash on and off. A battery and control circuitry may conveniently located in the base portion of the erected triangle, eg. in a casing in the rear face thereof. Electrical connections between portions of the triangle may be made by arcuate wiping contact strips.

The invention will now be described merely by way of example wits reference to the accompanying drawings, wherein FIG. 1 shows a warning triangle of the invention in its storage case.

FIG. 4 shows the reverse side of the triangle;

FIG. 7 is an enlarged view partially in section of the engagement between the triangle and the case.

Figure 2:
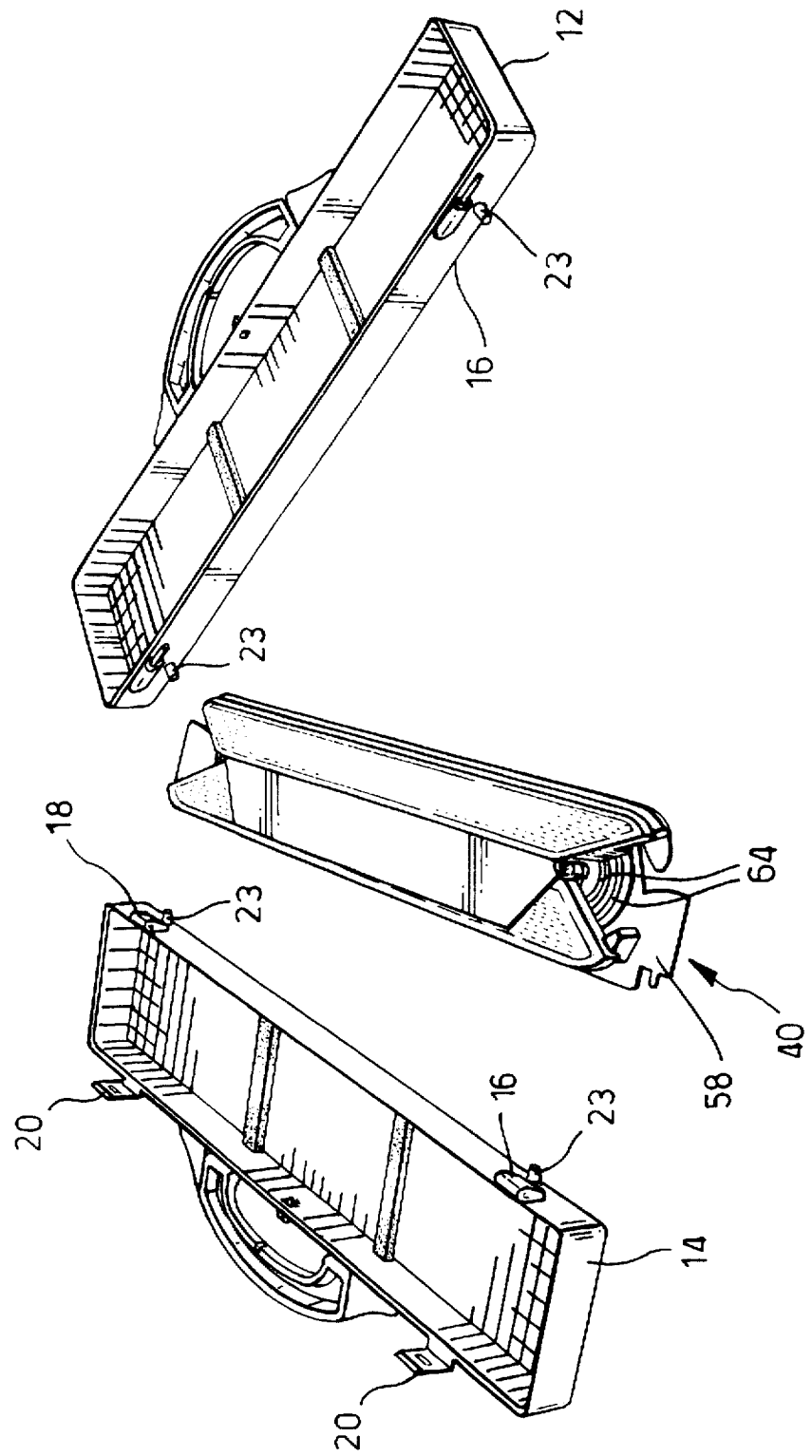
FIG. 2 shows the case open with its halves separated, the triangle being folded for storage.

Referring to FIG. 1, the warning triangle comprises a case 10 of uPVC or other tough non-brittle plastics material. The case Es formed in two halves 12, 14 divided along a longitudinal plane of symmetry The two halves are hinged together by separable pin hinges 16, 18 (FIG. 2) and secured shut by plastically-hinged clips 20 on case portion 14 which engage lugs 22 (FIG. 3 ) on portion 12. Feet 23 protrude to the same extend as the lugs 16, 18 so that each half of the case will stand stably in an upright position.

A handle is provided in two matching halves 24, 26, one on each case part 12, 14. The handle halves are pivotally supported between respective shoulders 28, 30. A groove 32 is defined on the top surface of the case midway between the shoulders 28, 30 by a pair of raised ridges 34, 36, bridging the two case portions 12, 14. A portion of the base of the groove in each half of the case is cut away to form a respective aperture 38, for purposes discussed hereafter. The underside of each handle portion has a groove 39 (FIG. 7) aligned with the groove 32.

Figure 3:
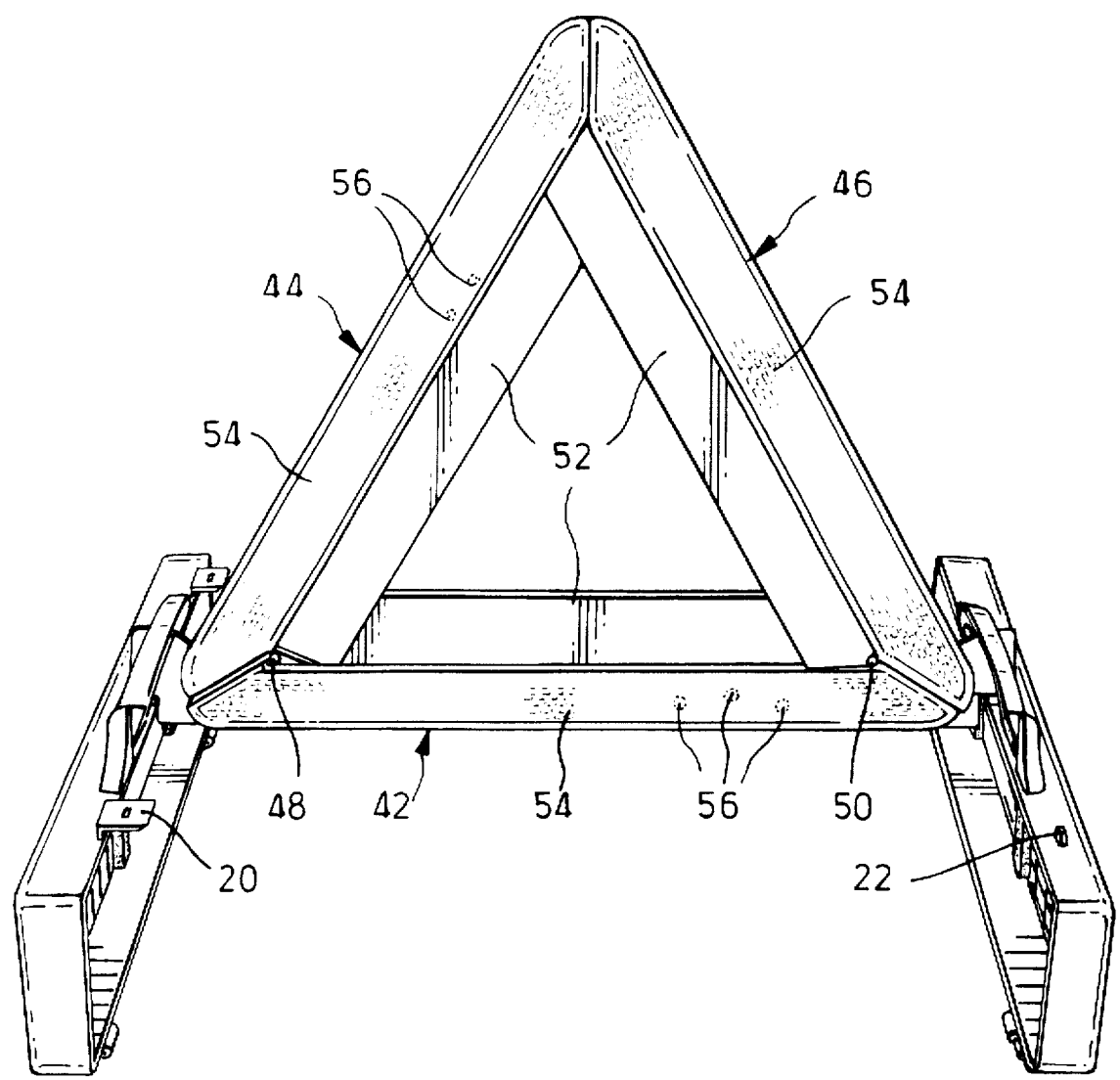
FIG. 3 shows the triangle in its erected configuration.

The case contains a foldable warning triangle 40 shown in FIG. 2 in its folded position for storage. The triangle consists of a base portion 42 with two further portions 44, 46 of the same length pivoted thereto at 48, 50, all three portions having conforming angled ends so than when the portions 44, 46 are pivoted upwards they form an equilateral triangle. The outer ends of portions 44, 46 are formed to interengage each other to maintain the triangle in its erected form.

Figure 5:
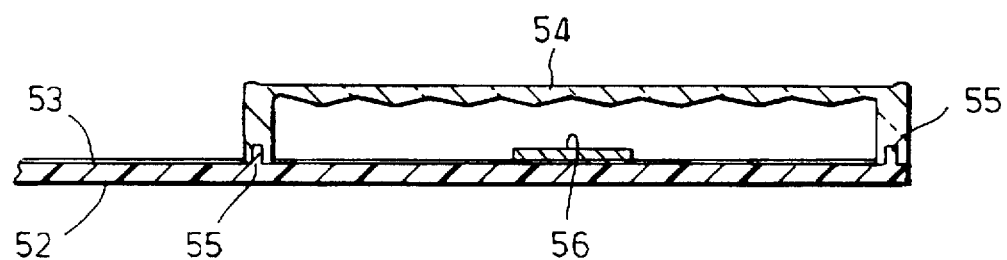
FIG. 5 is a section through one of the sides of the triangle.
Figure 6:
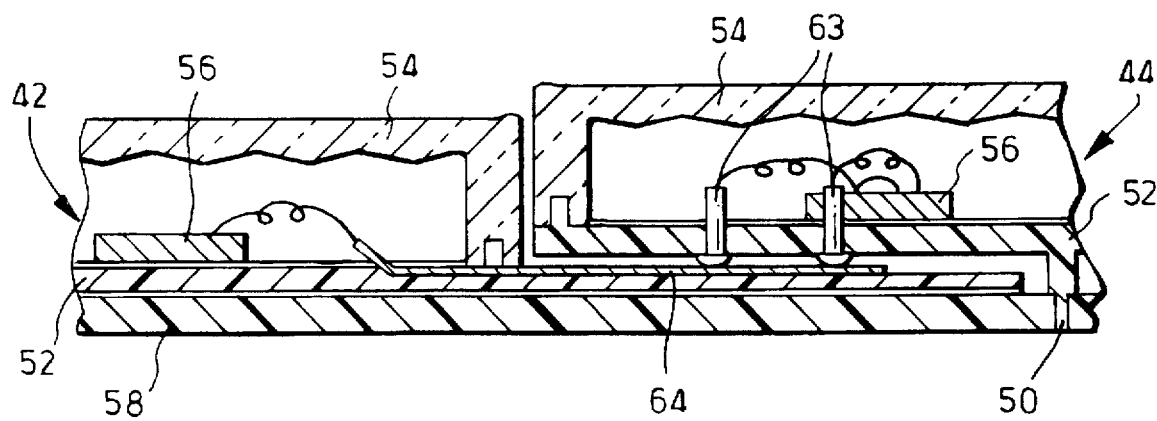
FIG. 6 shows the electrical connections between sides of the triangle.

Each triangle portion comprises a backing board 52 coated with light red fluorescent reflective material as used for example on road signs, the outer portion of the board having fixed thereto a translucent plastics moulding 54 incorporating a multiplicity of reflective red tenses (FIG. 5). A waterproof mortise (tongue and groove) joint 55 is provided between the board and the edge of the moulding 54 to prevent the ingress of water during use.

Behind the lenses a series of LEDs or lamps 56 are arranged along the length of the portions 42, 44, 46 so that the triangle can be illuminated at night for greater visibility.

The portion 42 is backed by a metal plate 58 on the rear surface of which is provided a battery container 60 (FIG. 4), switch and flasher circuitry (not shown, known per se) which drives the lamps intermittently so that they flash on and off. The lamps in triangle portions 44, 46 are connected to the battery and control circuitry in the base portion 42 via wiping contacts 63 bearing upon curved contact strips 64 (FIGS. 2 and 7) centered on the adjacent pivot 48 or 5G.

Referring to FIG. 7, there is shown one end of plate 58. The lower corner of the plate is cut away to form a notch 68 with a projecting tooth 70. The notch and tooth are configured so that the upper edge of the notch is received in the groove 32 between ridges 34, 36 on the top edge of the case portion 12, and the Foot enters the aperture 38.

The upper corner of the plate 38 is also cut away to define an arcuate edge 72. The pivot axis 74 of the handle portion 24 is positioned relative to the groove 32 and aperture 38 so that the handle portion may be pivoted clockwise as shown at 24a in FIG. 7 to permit the plate 58 to be engaged in the groove 32 and aperture 38, and then pivoted clockwise to position 24b in which the arcuate edge 72 is received in the groove 39 on the underside of the handle portion 24. The groove 39 closely conforms to the arcuate edge 72, and thus the end of the plate 58 is securely retained in the grooves 39, 32 in the handle and the top of the case.

Thus, to make use of the warring triangle, the case is opened and separated into its two halves, the triangle is erected and the ends of the plate 38 are inserted in the respective grooves 32 and locked by means of the handle portions 24, 26. The resulting assembly is H-shaped in plan as can been seen from FIG. 3, with the triangle extending transversely of the case parts 12, 14. This structure is stable and resistant to toppling of the triangle both sideways and by rotation about its base, and further can be collapsed into compact form for storage in the case with no small loose parts. This is a further advantage in a product which may be used only very intermittently. Another advantage is that the batteries and electrical circuitry are wholly contained within the triangle, obviating the iced for any wires to extend from the triangle to the case or even (as in some prior art constructions) to the car battery.

Each feature disclosed in this specification (which term includes the claims) and/or shown in the drawings may be incorporated in the invention independently of other disclosed aid/or illustrated features.

I claim:

1. A warning triangle assembly comprising structure erectable into a triangle assembly having a base, a case for containing the structure when collapsed for storage, the case being separable into two parts forming supports with means for receiving respective spaced apart portions of the base of the erected triangle assembly to support the erected triangle in an upright position, the erected triangle extending transversely of the case parts when so supported, said means for receiving including an extending handle portion positionable to secure the erected triangle assembly to the respective case part.

2. A triangle assembly as claimed in claim 1 wherein the base portions are opposite corners of the base of the erected triangle.

3. A triangle assembly as claimed in claim 2 wherein the erected triangle assembly has projecting end formations at said opposite corners of its base which are received in slots in the case parts.

4. A triangle assembly as claimed in claim 3 wherein each handle portion is pivotable about a respective pivot axis, between a position in which a part of each handle engages a respective one of said end formations and retains it in the slot, and a position in which each respective end formation is released.

5. A triangle assembly as claimed in claim 1 comprising means for illuminating the triangle.

6. A triangle assembly as claimed in claim 5 wherein the illuminating means comprises lights distributed around the sides of the triangle.

7. A triangle assembly as claimed in claim 5 comprising means for causing the illuminating means to flash on and off.

8. A triangle assembly as claimed in claim 5 the base of the erected triangle comprises a battery for the illuminating means.

9. A triangle assembly as claimed in claim 1 comprising pivot means pivotally connecting each handle portion to its respective case part, each handle portion being pivotable between said position in which it secures the erected triangle assembly to the case part, and a position in which it releases the erected triangle.

* * * * *